UNITED STATES PATENT OFFICE.

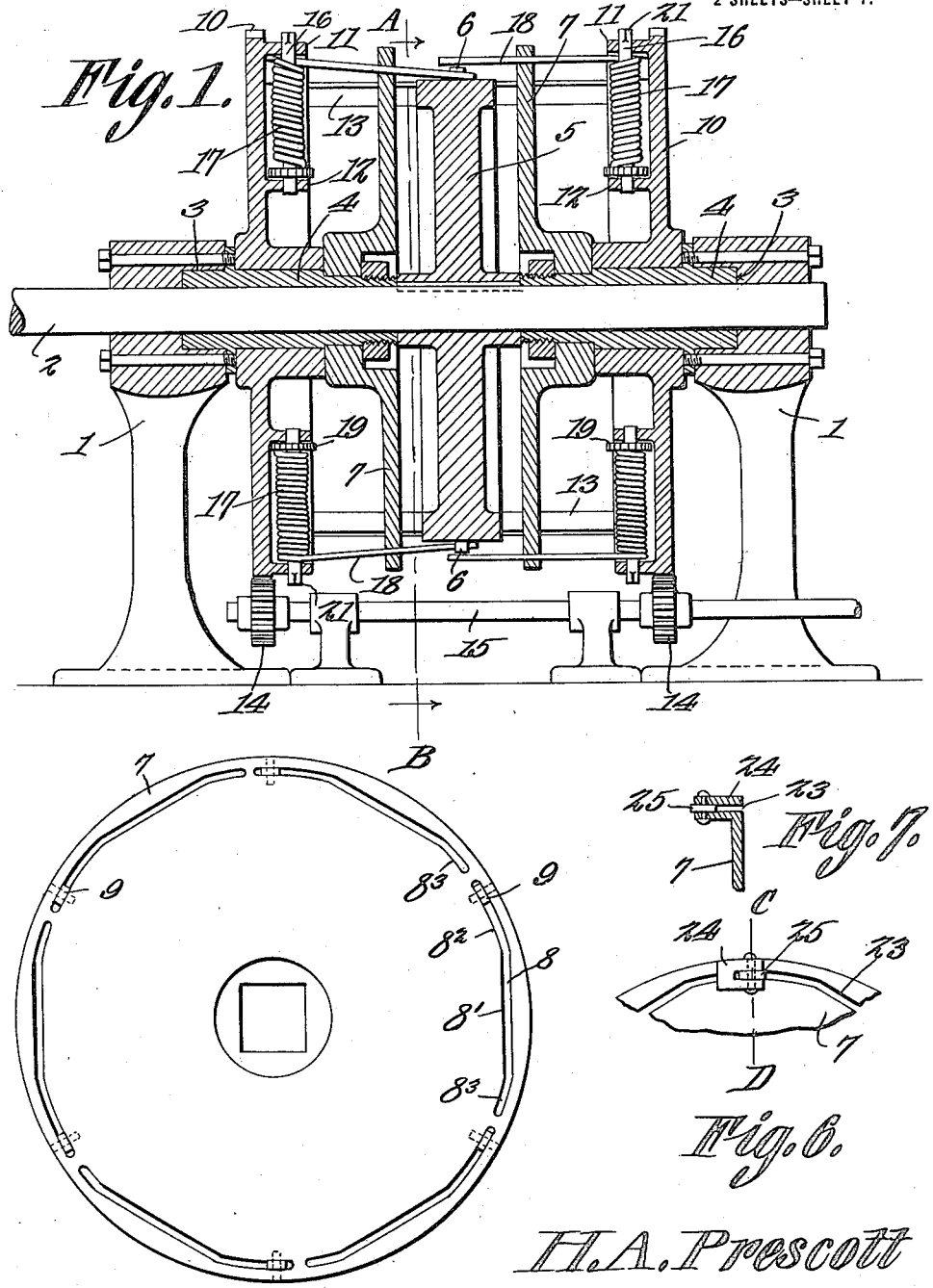

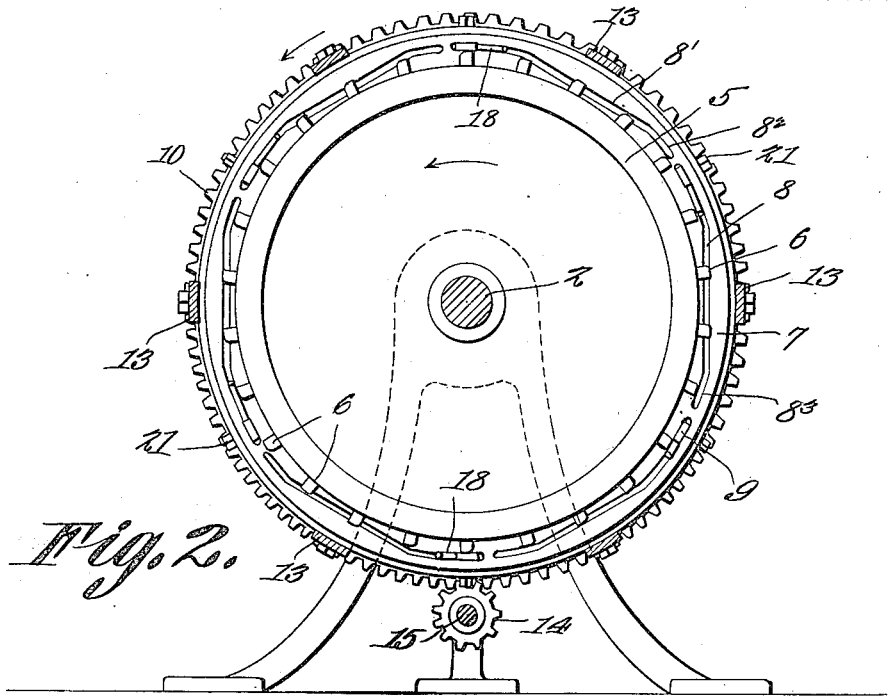
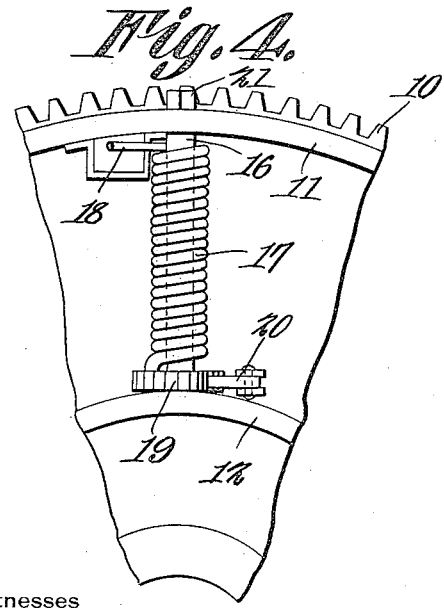
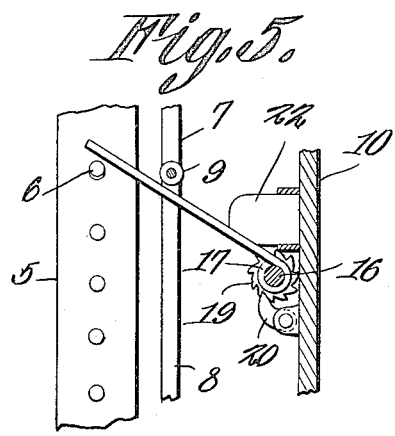

HENRY A. PRESCOTT, OF BETHLEHEM, PENNSYLVANIA.

SPEED-MULTIPLYING MECHANISM.

1,220,454.  Specification of Letters Patent.  Patented Mar. 27, 1917.

Application filed March 23, 1916. Serial No. 86,219.

*To all whom it may concern:*

Be it known that I, HENRY A. PRESCOTT, a citizen of the United States, residing at Bethlehem, in the county of Northampton and State of Pennsylvania, have invented a new and useful Speed-Multiplying Mechanism, of which the following is a specification.

This invention relates to speed multiplying mechanism especially designed for use in connection with slowly operating prime movers, one of its objects being to provide a mechanism of this character including a driven element and means for subjecting said element to propelling impulses intermittently applied whereby said driven element is speeded up far beyond the speed of its actuating means and without the use of cumbersome trains of gearing, belts or the like.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a central vertical section through the mechanism constituting the present invention.

Fig. 2 is a section on line A—B Fig. 1.

Fig. 3 is a side elevation of one of the guide disks.

Fig. 4 is an inner elevation of a portion of one of the driven gears.

Fig. 5 is a plan view of a portion of the mechanism.

Fig. 6 is an elevation of the inner side of a modified form of guide disk.

Fig. 7 is a section on line C—D Fig. 6.

Referring to the figures by characters of reference 1 designates bearings which can be of any construction desired and journaled in these bearings is a driven shaft 2. Each bearing is preferably formed with a counterbore 3 in which is seated one end of a bearing sleeve 4, the two bearing sleeves being extended toward each other but being spaced apart. Secured to that portion of the shaft 2 between the inner ends of the bearing sleeves 4 is an impulse receiving wheel 5 which, in the construction illustrated, is provided with regularly spaced peripheral teeth 6. Fixedly mounted upon each bearing sleeve 4 is a guide disk 7, these guide disks being located close to and at opposite sides of the wheel 5. The diameter of each guide disk is greater than that of the wheel 5 and formed in each guide disk close to its periphery are guide slots 8 as shown in Fig. 3 and which slots are provided with straight intermediate portions 8' and straight end portions $8^2$ and $8^3$, said end portions being disposed at obtuse angles relative to the intermediate portions. The end portions $8^2$ and $8^3$ of adjoining slots aline as shown in Fig. 3 and journaled within the end portion $8^2$ of each slot is a roller 9.

Journaled on each bearing sleeve 4 between the bearing member 1 and the guide disk 7 is a driven gear 10 having concentric flanges 11 and 12 extending from the inner side thereof. The flanges 11 of the two gears are connected by cross strips 13 whereby the gears are caused to travel as one body, these cross strips being supported beyond the peripheries of the guide disks 7. Gears 10 mesh with and are adapted to be driven by smaller gears 14 secured to a drive shaft 15 which can receive its motion from any source as, for example, from a wheel propelled by a slowly moving stream, or from a motor of any type.

Mounted within the flanges 11 and 12 are radially disposed pins 16, the number of these pins being equal to the number of slots 8 in one of the disks 7. Mounted on each of the pins 16 is a coiled spring 17 one end of which is secured to the pin while the other end forms a long actuating finger 18. A ratchet 19 is connected to each pin 16 and is normally engaged by a pawl 20 whereby the spring 17 will be held under tension, it being possible to increase the tension of the spring by placing a wrench or the like in engagement with the angular outer end 21 of the pin 16 and rotating the pin to wind the spring and cause the teeth of the ratchet 19 to slip past the pawl 20.

Pins 16 with their springs 17 are spaced equally apart and the fingers 18 are extended through the respective slots 8 in the adjoining guide disk 7. The springs on the two gears 10 are obviously oppositely disposed so that the force exerted by all of the fingers 18 will be in the general direction of rotation of the driven shaft 2.

As the connected gears 10 rotate and as the disks 7 are stationary, it will be apparent that when the gears 10 are driven by the gears 14, the spring fingers 18 at one side of the apparatus will be brought simultaneously against the rollers 9 carried by the adjacent disk 7 and will be pressed backwardly by these rollers until they ultimately wipe past the rollers whereupon they will be simultaneously released and will spring from the rollers into the adjacent slot 8. The spring fingers will sweep longitudinally of the respective slots and these slots will guide them tangentially of the wheel or rotor 5 with the result that all of the fingers in action will simultaneously strike certain of the teeth on the wheel or rotor 5 with the result that said wheel will be given an impulse at a number of points upon its periphery equal to the number of springs carried by the gears 10. As the spring fingers 18 approach the rollers 9 in the path thereof during the propulsion of the wheel 5 as above described, they will be brought to a stop by coming against cushions 22 located in the paths thereof and carried by the gears 10. These cushions act as shock absorbers and reduce wear and tear upon the mechanism to the minimum. During the movement of each finger from one end to the other of a slot 8, it first moves against one of the teeth 6, then sweeps the tooth before it, thus rotating the wheel 5, and finally enters the end portion $8^2$ of the slot where the finger is held beyond the path of the tooth so that the wheel can continue to rotate without coming into contact with the finger 18. The two sets of fingers 18 extending from the respective gears 10 can be so disposed as to operate alternately upon the wheel 5 so that a rapid intermittent application of impulses to the wheel can be effected. Obviously the power applied to the wheel can be increased by increasing the number of springs upon each of the gears 10 and by increasing the tension of the springs 17.

While the guide disks 7 have been shown provided with separate slots 8, it is to be understood that if desired a single slot 23 can be extended continuously within the disk, as shown in Figs. 6 and 7, there being laterally extending yokes 24 at regular intervals upon the disk and bridging the slot and the rollers 25 being journaled within these yokes. With this structure it is not necessary for the fingers 18 to leave the slots while wiping past the rollers 25 and, consequently, there is no danger of the fingers becoming displaced relative to the guide disk 7 during the operation of the mechanism.

What is claimed is:—

1. Speed multiplying mechanism including a rotor, spring actuating elements revoluble in the same direction with the rotor, means for simultaneously retracting said elements out of engagement with the rotor during their rotation, and simultaneously releasing said elements, and means for guiding the released elements into and out of engagement with the rotor thereby to impart an impulse to the rotor.

2. Speed multiplying mechanism including a rotor, an element revoluble in the same direction as the rotor, spring actuating members carried by said element, stationary means extending across the path of the members, means for rotating said element to bring the members against said stationary means, thereby to deflect the members, place them under increased tension and simultaneously release them during the continued rotation of said element, and means for guiding the released members into and out of engagement with the rotor to impart an impulse thereto.

3. Speed multiplying mechanism including a rotor, an element rotating in the same direction as the rotor, a resilient actuating member carried by said element, stationary means in the path of said member, means for rotating said element to bring the actuating member against said stationary means to deflect it, place it under increased tension and subsequently release it during the rotation of said element, and means for guiding the released member into and out of engagement with the rotor to impart an impulse thereto in the direction of rotation of said element.

4. Speed multiplying mechanism including a rotor, an element mounted for rotation adjacent thereto, a resilient actuating member carried by said element, a guide member interposed between the rotor and said revoluble element, said resilient actuating member being extended through the guide member, and means carried by the guide member for placing the actuating member under increased tension during the rotation of the element and for releasing the actuating member, said guide member constituting means for directing the actuating member into and out of engagement with the rotor to impart an impulse to the rotor in the direction of rotation of the revoluble element.

5. Speed multiplying mechanism including a rotor, a revoluble element adjacent thereto, a fixed guide interposed between the rotor and revoluble element, resilient actuating means carried by the revoluble element and movably engaging the guide, means upon the guide for extending into the path of said actuating means, means for rotating said element to move the actuating means against the means in the path thereof, thereby to deflect the actuating means and place it under increased tension during the rotation of said element and to release said actuating means, said guide member constituting means for directing the released actuating means into and out of engagement with the rotor, and a cushioning means for limiting the movement of the actuating means in one direction.

6. Speed multiplying mechanism including a rotor, a revoluble element adjacent thereto, a fixed guide interposed between the rotor and revoluble element, resilient actuating means carried by the revoluble element and movably engaging the guide, means upon the guide for extending into the path of said actuating means, means for rotating said element to move the actuating means against the means in the path thereof, thereby to deflect the actuating means and place it under increased tension during the rotation of said element and to release said actuating means, said guide member constituting means for directing the released actuating means into and out of engagement with the rotor, and means for adjusting the tension of the actuating means.

7. Speed multiplying mechanism including a rotor, a revoluble element adjacent thereto, a fixed guide interposed between the rotor and revoluble element, resilient actuating means carried by the revoluble element and movably engaging the guide, means upon the guide for extending into the path of said actuating means, and means for rotating the revoluble element to move the actuating means against the means in the path thereof, thereby to deflect the actuating means and place it under increased tension during the rotation of said element and to release the actuating means, said guide member constituting means for directing the released actuating means into and out of engagement with the rotor, means for adjusting the tension of the actuating means, and a cushion upon the revoluble element for limiting the movement of the actuating means.

In testimony that I claim the foregoing as my own, I have hereto affixed my signature in the presence of two witnesses.

HENRY A. PRESCOTT.

Witnesses:
 RUTH SCOTT,
 PHILOMENA A. ROCKELLI.

Copies of this patent may be obtained for five cents each, by addressing the "Commissioner of Patents, Washington, D. C."